(12) United States Patent
Saito et al.

(10) Patent No.: US 10,403,915 B2
(45) Date of Patent: Sep. 3, 2019

(54) ELECTRIC POWER SUPPLY SYSTEM, MOBILE OBJECT, AND ELECTRIC POWER SUPPLY METHOD

(71) Applicant: TOYOTA JIDOSHA KABUSHIKI KAISHA, Toyota-shi, Aichi-ken (JP)

(72) Inventors: Hiromu Saito, Toyota (JP); Ryo Shibuya, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 5 days.

(21) Appl. No.: 15/610,837

(22) Filed: Jun. 1, 2017

(65) Prior Publication Data
US 2017/0358809 A1    Dec. 14, 2017

(30) Foreign Application Priority Data
Jun. 9, 2016 (JP) .................................. 2016-115611

(51) Int. Cl.
| | |
|---|---|
| *H01M 8/04* | (2016.01) |
| *H01M 8/04223* | (2016.01) |
| *H01M 8/04082* | (2016.01) |
| *H01M 8/0438* | (2016.01) |
| *H01M 8/04492* | (2016.01) |
| *H01M 8/249* | (2016.01) |

(Continued)

(52) U.S. Cl.
CPC ... *H01M 8/04231* (2013.01); *H01M 8/04201* (2013.01); *H01M 8/04208* (2013.01); *H01M 8/04228* (2016.02); *H01M 8/04303* (2016.02); *H01M 8/04388* (2013.01); *H01M 8/04492* (2013.01); *H01M 8/249* (2013.01); *H01M 2008/1095* (2013.01); *H01M 2250/20* (2013.01); *Y02T 90/32* (2013.01)

(58) Field of Classification Search
CPC ......... H01M 8/04231; H01M 8/04303; H01M 8/04208; H01M 8/249; H01M 8/04228; H01M 8/04201; H01M 8/04492; H01M 8/04388; H01M 2008/1095; H01M 2250/20; Y02T 90/32
See application file for complete search history.

(56) References Cited

U.S. PATENT DOCUMENTS

2006/0246328 A1    11/2006    Willets et al.

FOREIGN PATENT DOCUMENTS

| | | |
|---|---|---|
| JP | H11162490 A | 6/1999 |
| JP | 2005-302591 | 10/2005 |

(Continued)

OTHER PUBLICATIONS

Machine translation of JP 2006-155997, retrieved from <https://www.j-platpat.inpit.go.jp/web/all/top/BTmTopEnglishPage> on Apr. 15, 2019.*

*Primary Examiner* — Cynthia K Walls
(74) *Attorney, Agent, or Firm* — Finnegan, Henderson, Farabow, Garrett & Dunner, LLP

(57) ABSTRACT

An electric power supply system includes first and second fuel cell stacks, a plurality of fuel tanks, a determination unit configured to determine the state of the first fuel cell stack during operation stop of the first and second fuel cell stacks, and a purging execution unit configured to execute purging by activating the first and second fuel cell stacks according to a determination result and opening on-off valves of the plurality of fuel tanks to supply fuel to the first and second fuel cell stacks.

4 Claims, 3 Drawing Sheets

(51) Int. Cl.
*H01M 8/04303* (2016.01)
*H01M 8/04228* (2016.01)
*H01M 8/1018* (2016.01)

(56) References Cited

FOREIGN PATENT DOCUMENTS

| | | |
|---|---|---|
| JP | 2006-155997 | 6/2006 |
| JP | 2007-305326 | 11/2007 |
| JP | 2009-140677 | 6/2009 |
| JP | 2012-004032 A | 1/2012 |

* cited by examiner

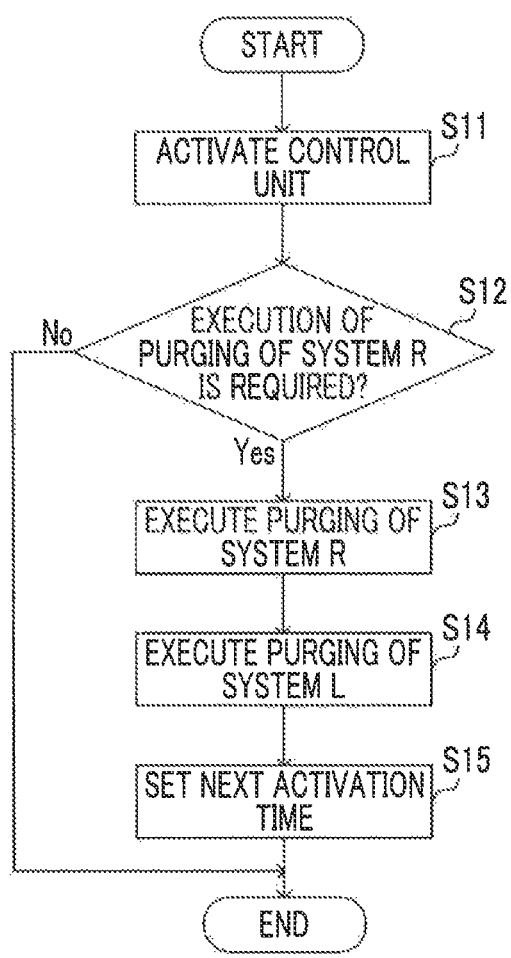

ELECTRIC POWER SUPPLY SYSTEM, MOBILE OBJECT, AND ELECTRIC POWER SUPPLY METHOD

INCORPORATION BY REFERENCE

The disclosure of Japanese Patent Application No. 2016-115611 filed on Jun. 9, 2016 including the specification, drawings and abstract is incorporated herein by reference in its entirety.

BACKGROUND

1. Technical Field

A disclosure relates to an electric power supply system, a mobile object, and an electric power supply method.

2. Description of Related Art

In recent years, a fuel cell vehicle in which an electric power supply system using a fuel cell and a secondary cell as a power supply is mounted has been provided. In such an electric power supply system, a system in which a plurality of fuel cell stacks are mounted is known. Japanese Patent Application Publication No. 2009-140677 (JP 2009-140677 A) discloses an electric power supply system which includes a plurality of fuel cell stacks and performs purging on a fuel cell stack having internal humidity exceeding a predetermined value during operation stop of the fuel cell stacks.

SUMMARY

However, in a fuel cell system in which a plurality of fuel cell stacks are mounted, in a case of executing purging by supplying fuel filled in a fuel tank to a fuel cell stack at the time of operation stop of the fuel cell stacks, each time conditions for purging are satisfied, purging is executed on a fuel cell stack satisfying the conditions among a plurality of fuel cell stacks. Since a high-pressure valve of the fuel tank is opened or closed for purging, electric power stored in a battery is consumed for every purging. As a result, there is a concern that activation electric power for starting the operation of the fuel cell system is in shortage due to the power consumption of the battery caused by repetitive execution of purging.

A disclosure is to provide a technique for, in a fuel cell system, in which a plurality of fuel cell stacks are mounted, reducing power consumption due to purging at the time of operation stop of the fuel cell stacks.

An electric power supply system according to a first aspect includes a plurality of fuel cell stacks, a plurality of fuel tanks respectively connected to the plurality of fuel cell stacks such that fuel is supplied to the plurality of fuel cell stacks, a determination unit configured to determine a state of a first fuel cell stack among the plurality of fuel cell stacks during operation stop of the plurality of fuel cell stacks, and a purging execution unit configured to execute purging on each of the plurality of fuel cell stacks by activating the plurality of fuel cell stacks according to a determination result by the determination unit and opening on-off valves of the plurality of fuel tanks to supply fuel to the plurality of fuel cell stacks.

A mobile object according to a second aspect includes a plurality of fuel cell stacks, a plurality of fuel tanks respectively connected to the plurality of fuel cell stacks such that fuel is supplied to the plurality of fuel cell stacks, a determination unit configured to determine a state of a first fuel cell stack among the plurality of fuel cell stacks during operation stop of the plurality of fuel cell stacks, and a purging execution unit configured to execute purging on each of the plurality of fuel cell stacks by activating the plurality of fuel cell stacks according to a determination result by the determination unit and opening on-off valves of the plurality of fuel tanks to supply fuel to the plurality of fuel cell stacks.

An electric power supply method according to a third aspect, for a fuel cell system including a plurality of fuel cell stacks and a plurality of fuel tanks respectively connected to the plurality of fuel cell stacks such that fuel is supplied to the plurality of fuel cell stacks, the electric power supply method comprises determining a state of a first fuel cell stack among the plurality of fuel cell stacks during operation stop of the plurality of fuel cell stacks, and executing purging on each of the plurality of fuel cell stacks by activating the plurality of fuel cell stacks according to the determined the state of the first fuel cell and opening on-off valves of the plurality of fuel tanks to supply fuel to the plurality of fuel cell stacks.

According to the first, second and third aspects, in a fuel cell system in which a plurality of fuel cell stacks are mounted, it is possible to provide a technique for reducing power consumption due to purging at the time of operation stop of the fuel cell stacks.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart showing the flow of processing by an electric power supply system according to the embodiment.

DETAILED DESCRIPTION OF EMBODIMENTS

Figure 1:
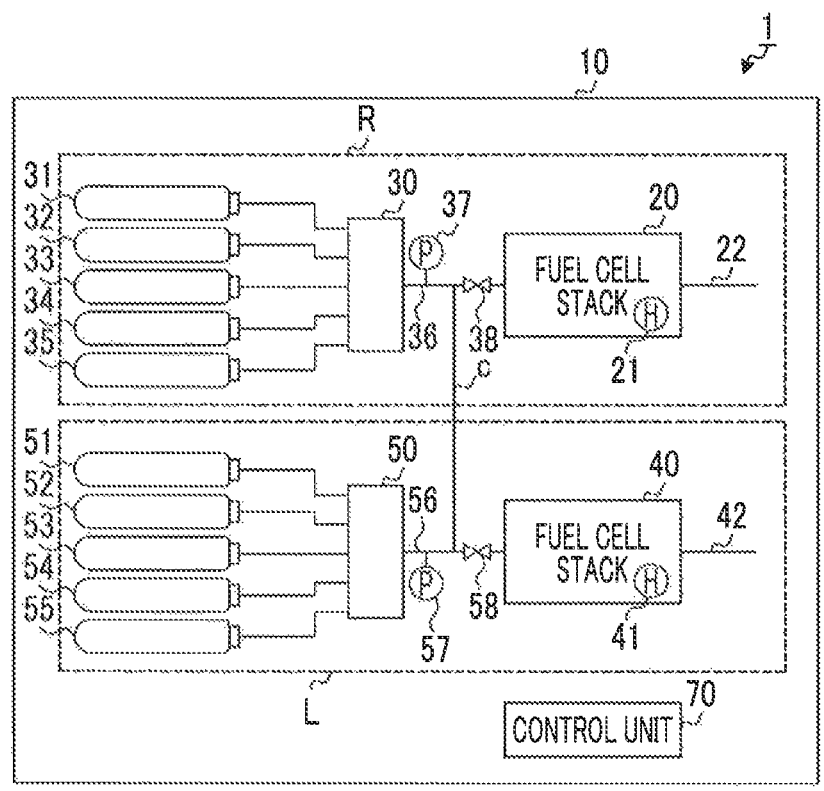
FIG. 1 is a diagram showing the schematic configuration of a mobile object according to an embodiment.

Hereinafter, an embodiment will be described in detail referring to the drawings.

[Configuration of Electric Power Supply System] Referring to FIG. 1, the illustrative schematic configuration of piping included in an electric power supply system according to an embodiment will be described. In the drawing, the illustrative schematic configuration of piping included in an electric power supply system 10 of a mobile object 1, such as a fuel cell vehicle is shown. The electric power supply system 10 includes a system R and a system L as an electric power supply system by a fuel cell stack. That is, the electric power supply system 10 includes a plurality of electric power supply systems (fuel cell stacks). Furthermore, the electric power supply system 10 includes a control unit 70 which controls the operations of the system R and the system L.

The system R includes, as a principal configuration, a fuel cell stack 20 (first fuel cell stack), a regulator 30, and fuel tanks 31 to 35. The fuel cell stack 20 includes a solid polymer electrolyte cell stack in which a plurality of cells (single cells (power generating bodies) including an anode, a cathode, and an electrolyte) are laminated in series. In operation at the time of normal generation of electric power by the fuel cell stack 20, an oxidation reaction represented by Formula (1) occurs on the anode, and a reduction reaction represented by Formula (2) occurs on the cathode. An electromotive reaction represented by Formula (3) occurs as the whole of the fuel cell stack 20, thereby generating electric power.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The fuel cell stack 20 includes a humidity sensor 21. The humidity sensor 21 is a sensor which measures humidity in the fuel cell stack 20 and outputs a measured value.

The fuel tanks 31 to 35 store high pressure hydrogen gas as fuel gas. The fuel tanks 31 to 35 are respectively connected to the regulator 30 through hydrogen flow passages. The regulator 30 is a regulation valve which regulates the pressure of hydrogen gas discharged from the fuel tanks 31 to 35 and supplies hydrogen gas after pressure regulation to the fuel cell stack 20 through a supply path 36.

The supply path 36 is provided with a pressure sensor 37 and a valve 38. The pressure sensor 37 is a sensor which measures the pressure of hydrogen gas supplied through the regulator 30. The valve 38 is an on-off valve which opens or closes the supply path 36. An anode-off gas discharge path 22 is a flow passage through which mixed gas including surplus hydrogen gas or the like not used in the above-described oxidation-reduction reaction in the fuel cell stack 20 is discharged from the fuel cell stack 20.

The system L includes a fuel cell stack 40 (second fuel cell stack), a humidity sensor 41, an anode-off gas discharge path 42, a regulator 50, fuel tanks 51 to 55, a supply path 56, a pressure sensor 57, and a valve 58. These configurations operate and function in the same manner as the fuel cell stack 20, the humidity sensor 21, the anode-off gas discharge path 22, the regulator 30, the fuel tanks 31 to 35, the supply path 36, the pressure sensor 37, and the valve 38 in the system R, and thus, description will not be repeated.

The supply path 36 in the system R and the supply path 56 in the system L are connected by a path c so as to enable a fluid, such as hydrogen gas, to flow therebetween. That is, the system R and the system L are connected by the path c communicating with each other between the fuel tanks 31 to 35 and the fuel tanks 51 to 55.

When deviation in the storage amount of hydrogen gas occurs in each hydrogen tank, if the fuel tanks 31 to 35 and the fuel tanks 51 to 55 are filled with hydrogen gas, there is a possibility that filling is performed in excess of a specified amount. As in this embodiment, the system R and the system L communicate through the path c, whereby it is possible to prevent filling in excess of the specified amount as described above.

The control unit 70 controls the operation and processing of each configuration in the electric power supply system 10. In particular, the control unit 70 activates the fuel cell stacks during operation stop of the fuel cell stack 20 and the fuel cell stack 40 and controls execution of purging. In this embodiment, purging is executed by opening the valve 38 and the valve 58 and supplying hydrogen gas supplied from the fuel tanks 31 to 35 and the fuel tanks 51 to 55 through the regulator 30 and the regulator 50 to the fuel cell stack 20 and the fuel cell stack 40.

Figure 2:
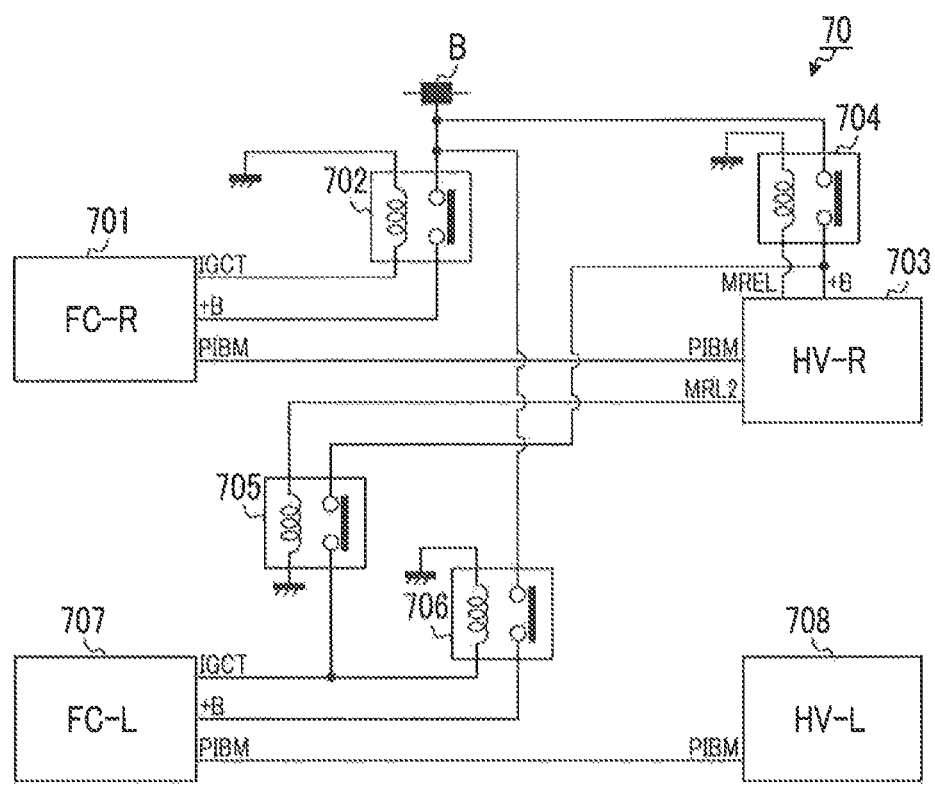
FIG. 2 is a diagram showing the schematic configuration of a control unit according to the embodiment.

The configuration of the control unit 70 and control of purging will be described referring to FIG. 2. As shown in the drawing, the control unit 70 includes, as a primary configuration, a battery B, a FC-R 701, a relay 702, a HV-R 703, a relay 704, a relay 705, a relay 706, a FC-L 707, and a HV-L 708.

The battery B is an electric power storage unit which supplies drive electric power of the configurations in the control unit 70. The battery B outputs, for example, electric power of a voltage of 12 V.

The FC-R 701 is an engine control unit (ECU) which controls the operations of the configurations in the system R. The FC-R 701 is activated by an internal timer during operation stop of the fuel cell stacks 20, 40 and outputs a control signal to the relay 702 connected thereto through an IGCT terminal. The relay 702 is brought into a closed state (ON state) according to an input of the control signal from the IGCT terminal of the FC-R 701, and electric power from the battery B connected to the relay 702 is supplied to the FC-R 701 through a +B terminal as drive electric power.

The FC-R 701 determines the state of the fuel cell stack 20 after activation, thereby determining the necessity for execution of purging. As a method of the determination, for example, the FC-R 701 acquires the value of humidity in the fuel cell stack 20 measured by the humidity sensor 21, and in a case where the value of humidity is equal to or greater than a predetermined threshold (for example, 70% RH), determines that execution of purging is required. If it is determined that execution of purging is required, the FC-R 701 outputs a control signal to the HV-R 703 connected thereto through a PIBM terminal.

The HV-R 703 is an ECU which controls the operation of high-voltage system accessories of the system R. The HV-R 703 is activated when the control signal is received from the FC-R 701 through the PIBM terminal, and outputs a control signal to the relay 704 connected thereto through a MREL terminal. If the control signal is received, the relay 704 is brought into an ON state. If the relay 704 is brought into the ON state, electric power from the battery B is supplied to the HV-R 703 as drive electric power. If drive electric power is supplied, the HV-R 703 opens the valve 38 and performs control such that hydrogen gas supplied from the fuel tanks 31 to 35 through the regulator 30 is supplied to the fuel cell stack 20, thereby controlling execution of purging of the fuel cell stack 20. That is, the HV-R 703 functions as a purging execution unit.

The HV-R 703 further outputs a control signal to the relay 705 connected thereto through a MRL2 terminal after drive electric power is supplied and brings the relay 705 into an ON state. If the relay 705 is brought into the ON state, the relay 706 connected to the relay 705 is brought into an ON state by a current flowing from the battery B through the relay 704 and the relay 705. If the relay 706 is brought into the ON state, electric power is supplied from the battery B to the FC-L 707 through the relay 706 as drive electric power.

The FC-L 707 is an ECU which controls the operations of the configurations in the system L. The FC-L 707 is activated upon receiving the supply of the drive electric power through the relay 706, and outputs a control signal to the HV-L 708 connected thereto through a PIBM terminal.

The HV-L 708 is an ECU which controls the operations of high-voltage system accessories of the system L. The HV-L 708 is activated upon receiving the control signal from the FC-L 707 through the PIBM terminal, and controls execution of purging of the fuel cell stack 40. Specifically, the HV-L 708 opens the valve 58 and performs control such that hydrogen gas supplied from the fuel tanks 51 to 55 through the regulator 50 is supplied to the fuel cell stack 40. That is, the HV-L 708 functions as a purging execution unit.

As described above, according to the electric power supply system 10 of this embodiment, the FC-R 701 determines the necessity for execution of purging of the fuel cell stack 20 during operation stop of the fuel cell stacks 20, 40. If it is determined that execution of purging is required, the HV-R 703 and the HV-L 708 open the valves 38, 58 and perform control such that fuel gas (hydrogen gas) supplied from the fuel tanks 31 to 35, 51 to 55 through the regulators 30, 50 is supplied to the fuel cell stacks 20, 40 to execute purging of the fuel cell stacks 20, 40.

The electric power supply system 10 is configured as above, whereby instead of executing purging only for a fuel cell stack where a request occurs for each purging request in each fuel cell stack during operation stop of the fuel cell stacks 20, 40, purging is executed for both of the fuel cell stacks 20, 40 when a purging request occurs in one of the fuel cell stacks 20, 40. Therefore, it is possible to reduce power consumption due to purging during operation stop of the fuel cell stacks 20, 40.

In the electric power supply system 10 of this embodiment, the system R and the system L communicate through the path c. Accordingly, if purging is executed only for one of the fuel cell stacks 20, 40, there is a concern the configuration in the electric power supply system 10, such as the supply path 36 or the supply path 56, is damaged due to deviation in pressure. However, in this embodiment, purging is executed simultaneously for both of the fuel cell stacks 20, 40 when a purging request occurs in one of the fuel cell stacks 20, 40, whereby it is possible to avoid damage described above.

[Control Flow] The flow of control of purging of the fuel cell stacks 20, 40 will be described referring to FIG. 3. This processing is executed under the control of the control unit 70.

First, in Step S11, the control unit 70 is activated by the timer during operation stop of the fuel cell stacks 20, 40. Next, in Step S12, the control unit 70 determines the state of the fuel cell stack 20 of the system R, thereby determining the necessity for execution of purging of the fuel cell stack 20. For example, the control unit 70 acquires the value of humidity in the fuel cell stack 20 measured by the humidity sensor 21, and in a case where the value of humidity is equal to or greater than the predetermined threshold, determines that execution of purging is required. In a case where it is determined that execution of purging is required, the process progresses to Step S13, and otherwise, the processing shown in FIG. 3 ends.

In Step S13, the control unit 70 opens the valve 38 and performs control such that hydrogen gas supplied from the fuel tanks 31 to 35 through the regulator 30 is supplied to the fuel cell stack 20, thereby controlling execution of purging of the fuel cell stack 20. That is, the control unit 70 controls execution of purging of the fuel cell stack 20 according to the determination result of the state of the fuel cell stack 20.

Next, in Step S14, the control unit 70 opens the valve 58 and performs control such that hydrogen gas supplied from the fuel tanks 51 to 55 through the regulator 50 is supplied to the fuel cell stack 40, thereby controlling execution of purging of the fuel cell stack 40. The control unit 70 can perform control such that purging of the fuel cell stack 20 in Step S13 and purging of the fuel cell stack 40 in Step S14 are executed simultaneously.

Next, the control unit 70 sets the timer for next activation, and ends the processing shown in FIG. 3.

As described above, according to the electric power supply system 10 of this embodiment, instead of executing purging only for a fuel cell stack where a request occurs for each purging request in each fuel cell stack during operation stop of the fuel cell stacks 20, 40, purging is executed for both of the fuel cell stacks 20, 40 when a purging request occurs in one of the fuel cell stacks 20, 40. Therefore, it is possible to reduce power consumption due to purging during operation stop of the fuel cell stacks 20, 40.

Although the embodiment has been described above referring to the drawings, the scope of the invention is not limited to such an embodiment. It is obvious for those skilled in the art that various alteration examples or modification examples can be thought of in the category of the idea described in the appended claims, and it can be understood that, needless to say, these examples belong to the technical scope of the invention.

What is claimed is:

1. An electric power supply system comprising:
a plurality of fuel cell stacks;
a humidity sensor that measures a value of humidity in a first fuel cell stack among the plurality of fuel cell stacks and outputs the measured value;
a source of electric power that stores electric power and is selectively connected through a plurality of relays to a plurality of control units to selectively supply drive electric power to respective control units of the plurality of control units;
a plurality of fuel tanks respectively connected to the plurality of fuel cell stacks through respective on-off valves that are controlled to open and close by respective ones of the control units such that fuel is supplied to the plurality of fuel cell stacks;
a first control unit of the plurality of control units configured to receive the measured value of humidity of the first fuel cell stack from the humidity sensor, compare the measured value to a predetermined threshold value to determine whether the humidity in the first fuel cell stack is equal to or greater than the predetermined threshold value, and output a first purge control signal indicative of a need to purge the first fuel cell stack when the humidity in the first fuel cell stack is equal to or greater than the predetermined threshold value during operation stop of the plurality of fuel cell stacks; and
a second control unit of the plurality of control units configured to receive the first purge control signal from the first control unit, open a first one of the respective on-off valves to supply fuel from at least one of the plurality of fuel tanks to the first fuel cell stack to purge the first fuel cell stack, and bring one of the plurality of relays into an on state to supply electric power from the source of electric power to a third control unit configured to supply a second purge control signal to a fourth control unit configured to receive the second purge control signal and open a second one of the respective on-off valves to supply fuel from at least one of the plurality of fuel tanks to a second fuel stack to purge the second fuel stack.

2. The electric power supply system according to claim 1, wherein
the plurality of fuel tanks are connected by a path communicating with each other.

3. The electric power supply system according to claim 1, wherein:
the second and fourth control units are configured to open the first and second on-off valves simultaneously to purge the first and second fuel cell stacks simultaneously.

4. A mobile object comprising:
a plurality of fuel cell stacks;
a humidity sensor that measures a value of humidity in a first fuel cell stack among the plurality of fuel cell stacks and outputs the measured value;
a battery configured to be selectively connected through a plurality of relays to a plurality of control units to selectively supply drive electric power to respective control units of the plurality of control units;
a plurality of fuel tanks respectively connected to the plurality of fuel cell stacks through respective on-off valves that are controlled to open and close by respective ones of the control units such that fuel is supplied to the plurality of fuel cell stacks;
a first control unit of the plurality of control units configured to receive the measured value of humidity of the first fuel cell stack from the humidity sensor, compare the measured value to a predetermined threshold value to determine whether the humidity in the first fuel cell stack is equal to or greater than the predetermined threshold value, and output a first purge control signal indicative of a need to purge the first fuel cell stack when the humidity in the first fuel cell stack is equal to or greater than the predetermined threshold value during operation stop of the plurality of fuel cell stacks; and
second control unit of the plurality of control units configured to receive the first purge control signal from the first control unit, open a first one of the respective on-off valves to supply fuel from at least one of the plurality of fuel tanks to the first fuel cell stack to purge the first fuel cell stack, and bring one of the plurality of relays into an on state to supply electric power from the battery to a third control unit configured to supply a second purge control signal to a fourth control unit configured to receive the second purge control signal and open a second one of the respective on-off valves to supply fuel from at least one of the plurality of fuel tanks to a second fuel stack to purge the second fuel stack.

* * * * *